United States Patent [19]

Johannes

[11] Patent Number: 5,226,460
[45] Date of Patent: Jul. 13, 1993

[54] METHOD OF PRODUCING A BEAD CORE FOR PNEUMATIC TIRES

[75] Inventor: Günter Johannes, Garbsen-Frielingen, Fed. Rep. of Germany

[73] Assignee: Continental Aktiengesellschaft, Hanover, Fed. Rep. of Germany

[21] Appl. No.: 749,500

[22] Filed: Aug. 16, 1991

Related U.S. Application Data

[63] Continuation-in-part of Ser. No. 578,931, Sep. 7, 1990, abandoned.

[30] Foreign Application Priority Data

Sep. 9, 1989 [DE] Fed. Rep. of Germany ....... 3929975

[51] Int. Cl.$^5$ ................................ B21F 3/02
[52] U.S. Cl. .................. 140/88; 140/92.2; 245/1.5
[58] Field of Search .............. 245/1.5; 140/88, 92.2

[56] References Cited

U.S. PATENT DOCUMENTS

| | | | |
|---|---|---|---|
| 817,328 | 4/1906 | Lloyd | 245/1.5 X |
| 1,503,985 | 8/1924 | Corson | |
| 3,170,662 | 2/1965 | Anderson | 245/1.5 X |
| 3,741,507 | 6/1973 | Hahn | 245/1.5 |
| 3,861,442 | 6/1975 | Bertrand | 245/1.5 X |
| 3,942,574 | 3/1976 | Bantz | 245/1.5 X |
| 3,991,949 | 11/1975 | Ureshino | |
| 4,043,371 | 8/1977 | Pakur et al. | 245/1.5 X |
| 4,098,316 | 7/1978 | Carvalho et al. | 245/1.5 X |
| 4,166,492 | 9/1979 | Pfeiffer | 245/1.5 X |
| 4,219,375 | 8/1980 | Vandale et al. | 140/88 X |
| 4,319,622 | 3/1982 | Iuchi et al. | 245/1.5 X |
| 4,365,492 | 12/1982 | Kortan et al. | 140/88 X |
| 4,477,301 | 10/1984 | Bouju et al. | 245/1.5 X |
| 4,496,411 | 1/1985 | Davies et al. | 140/88 X |
| 4,557,307 | 12/1985 | Philpott | 245/1.5 X |
| 4,662,961 | 5/1987 | Phillpott | |
| 4,759,813 | 7/1988 | Banas et al. | 140/88 X |
| 4,823,857 | 4/1989 | Orjela et al. | 245/1.5 X |
| 4,938,437 | 7/1990 | Rausch | 245/1.5 |

FOREIGN PATENT DOCUMENTS

| | | | |
|---|---|---|---|
| 0303514 | 8/1988 | European Pat. Off. | |
| 1070965 | 12/1959 | Fed. Rep. of Germany | 245/1.5 |
| 1665295 | 1/1971 | Fed. Rep. of Germany | 140/92.2 |
| 2409816 | 9/1975 | Fed. Rep. of Germany | |
| 2820191 | 11/1978 | Fed. Rep. of Germany | |
| 3738446 | 5/1989 | Fed. Rep. of Germany | |
| 268699 | 6/1989 | Fed. Rep. of Germany | 245/1.5 |
| 45-11455 | 4/1970 | Japan | 140/92.2 |
| 63907 | 5/1980 | Japan | 245/1.5 |
| 124511 | 7/1985 | Japan | 245/1.5 |
| 295107 | 12/1986 | Japan | 245/1.5 |
| 152908 | 7/1987 | Japan | 245/1.5 |
| 37003 | 2/1990 | Japan | 245/1.5 |

Primary Examiner—Mark Rosenbaum
Assistant Examiner—Frances Chin
Attorney, Agent, or Firm—Robert W. Becker & Associates

[57] ABSTRACT

A bead core for pneumatic vehicle tires, a method of producing same, and a winding reel for carrying out such a method are provided. The bead core comprises a plurality of spirally wound layers, each of which comprises load-carriers that are disposed next to one another. To increase the precision of the trueness of pneumatic vehicle tires that are provided with such bead cores, while maintaining the ability to rapidly wind such cores, each of the layers of the core has a radial dimension component that is greater than an axial dimension component thereof.

4 Claims, 5 Drawing Sheets

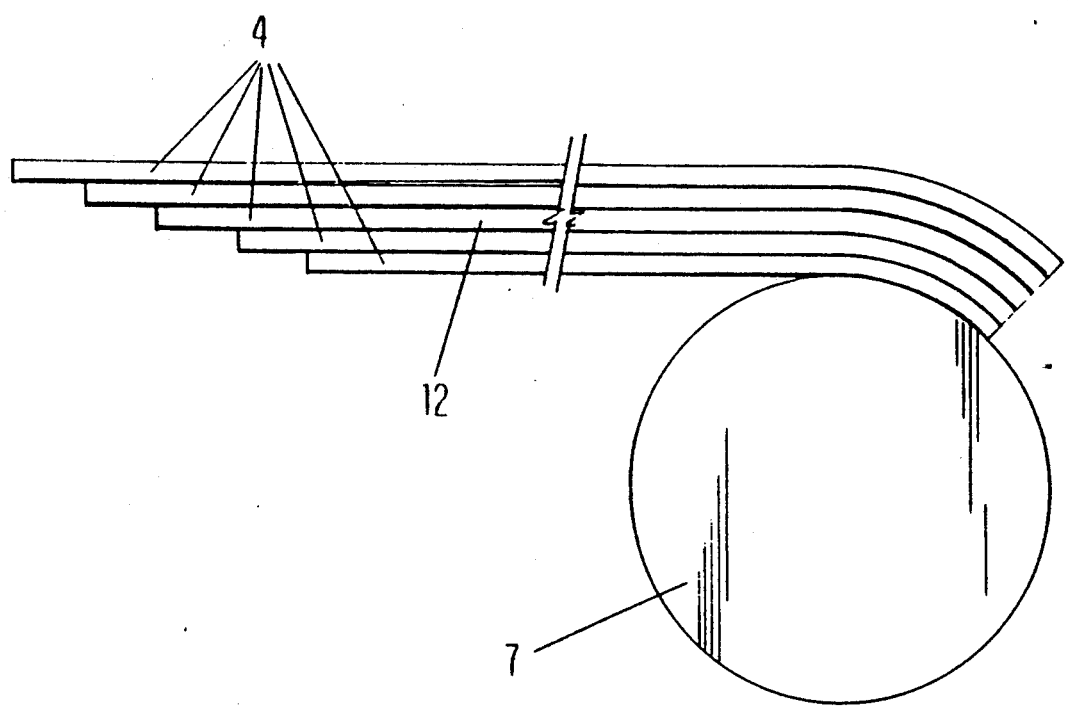
FIG—5

METHOD OF PRODUCING A BEAD CORE FOR PNEUMATIC TIRES

This application is a continuation-in-part of application Ser. No. 578,931 filed Sep. 7, 1990.

BACKGROUND OF THE INVENTION

The present invention relates to a bead core for a pneumatic vehicle tire, with the bead core comprising a plurality of spirally wound layers, each of which in turn comprises load-carriers that are disposed next to one another. The present invention also relates to a method for producing such bead cores, and to a winding reel as an apparatus for carrying out such a method.

Furthermore, the present invention relates to a bead core for a pneumatic vehicle tire that comprises load-carriers in the form of a wire that are arranged in a plurality of layers, whereby the thickness of the layers corresponds essentially to the thickness of the wire of the load-carriers and the width of the corresponds essentially to n times the thickness of the wire of the load-carriers. The number n corresponds to the number of load-carriers within each layer, with the load carriers being disposed adjacent to one another within each layer. The layers are wound from a single ply of adjacently disposed load-carriers. The width of the ply varies at most only at the beginning and/or at the end of the ply, whereby the beginning of the ply and/or the end of the ply have at most a length that corresponds to the circumference of the bead core.

In addition to so-called cable cores where the load-carriers are twisted relative to one another in conformity with various patterns, the subject wound cores, so-called Pierce cores, have gained extensive ground due to the fact that they are quite economical and due to the great freedom with regard to the configuration of the core cross-section. To produce this type of core, an endless layer is first formed from load-carriers that are disposed next to one another and are embedded in rubber. Aside from the other dimensions, in particular the considerably more compact positioning of the load-carriers or wires, such a layer in principle resembles a flat or ribbon cable that is known from the electrical field, where the insulation would be analogous to the rubber. The number of load-carriers of a layer that are disposed next to one another depends upon the size of the tire and is between three and nine. From such a layer, the Pierce core is built up by attaching the end of the layer to the surface of a cylindrical reel, and then winding the layer to form several windings, whereupon the layer is cut and the end of the layer is pressed on. Depending upon the size of the tire, three to eight windings are applied. Analogous to the language utilized when describing carcasses, the individual windings of a bead core that is produced in such a way are generally designated as "layers", and this language will also be utilized in the subject application. Bead cores produced in the manner described are designated in the art as Pierce cores.

In the following, the individual windings of a bead core produced according to the above described process will be designated by the term "layer" in correspondence to their appearance in a cross-sectional view. With Pierce cores, the core layers extend generally parallel to the seating surface of the rim, i.e., essentially axially. The wires within one layer are arranged adjacent to one another. The layers are wound from a single ply. The layers have a thickness that corresponds to the sum of the thickness of the wire and of the rubber material in which the wire is embedded. The thickness of the rubber material is smaller by at least a factor of 10 when compared to the thickness of the wire. Accordingly, in the following it is assumed that the thickness of the layer corresponds essentially to the thickness of the wire.

Aside from the aforementioned advantages, the Pierce cores have the drawback that the inner radius of the bead core unevenly varies at the beginning of the first winding by the thickness of one layer. This uneven fluctuation of the radius continues to a certain extent into the carcass and leads to a systematic inaccuracy of the trueness or concentricity. Although this inaccuracy can to a large extent be kept to a minimum by wrapping the layers onto the tire build-up machine in a particularly skillful manner, this of course makes it more difficult to automate the process of constructing the tire carcass. Although this source of inaccuracies is lessened if the thickness of the layers is reduced and thereby the number of layers is increased, the construction of the bead core then becomes more expensive and ultimately, if this direction of development is followed to its extreme, becomes susceptible to warping.

A bead core is known from DE-OS 28 20 191 which describes the use of a metal band (in the same layer arrangement that corresponds to the Pierce core) instead of a ply formed from wires. The metal band has a greater bending resistance with respect to axial warping due to its alignment in the axial direction. However, these bead cores have not been successful due to their differing behavior in various load situations.

A further development of the Pierce core is known from DE-OS 37 38 446 in which, in order to achieve a more uniform structure of the ply, the beginning and the end of the ply are cut in a slanted fashion relative to the axial direction. Accordingly, not all of the wires of the first ply will end at the same circumferential location. The desired effect, however, may only be observed when the slant is quite great, for example, when the cutting location is distributed over at least one quarter of the circumference. The individual wire cross-section may not be cut at such a sharp angle, however, because the wire would than act lake a knife thus damaging the second ply as well as the bead core sheathing. The cutting should therefore be carried out (according to claim 2 of the cited reference) in a stepped manner which, on the other hand, will increase the production coasts.

Two more methods for making the beginning of the ply more uniform are disclosed in EP-0 303 514 A1. These methods comprise: a slanted cutting (when viewed from the side), i.e., at an angle relative to the radial direction, and the incorporation of the beginning of the wire (after being cut in the axial direction) between different layers. A sufficiently slanted cut relative to the radial direction does not result in the same amount of damage to the surrounding components as described in the previous prior art reference, but is somewhat dubious when lateral forces must be transmitted. Furthermore, the required cuts at such a great angle are hardly performable due to the ductility of the wire. The incorporation of the beginnings of the wire between different layers in time-consuming and requires that the production be interrupted for each cutting step.

From U.S. Pat. No. 3,170,662 as well as from DE-OS 24 09 816 and U.S. Pat. No. 3,942,574 a bead core embodiment is known which is formed from a single wire that is wound into a plurality of separate spirals having an essentially radial cross-section. The individual spirals are then attached to one another in their axial direction, whereby the fastening is solely achieved via the frictional connection between the rubber material in which the wire is embedded. These bead cores also have the beginning of the wire located at the radially inner side of the individual spiral and are thus suffering from the same disadvantages as the Pierce core. Furthermore, the individual spiral windings are only connected via the frictional force between the rubber material.

From claim 6 of DE-OS 37 38 446 a further development of a bead core manufactured in the aforementioned manner from individual disk-like elements is known, whereby the respective beginnings of the wire of the individual layers (disposed at the radially inner side) are spaced from one another over the inner circumference so that these discontinuities are evenly distributed. The handling and logistics during manufacture of such a bead core are difficult. Furthermore, each one of the individual beginnings of the wire still represents about half of the discontinuity that results from arranging all of the beginnings of the wire at the same circumferential location. However, since more than twice the number of discontinuities result, the noise level resulting from this arrangement is increased but shifted to a higher frequency which may be dampened more easily.

U.S. Pat. No. 1,503,985 refers to a bead core made from sheet metal that is wound into a helix. The width of the sheet metal continuously increases from a minimum to a maximum so that the resulting shape has a triangular cross-section.

It is an object of the present invention to provide a bead core that while in principle maintaining the particularly economical winding-up of a single rubber-coated load-carrier layer, and without well-aimed manual adaptation of the length of the amount that the carcass plies are looped about the bead core, makes it possible to provide a pneumatic vehicle tire that has an improved concentricity.

BRIEF DESCRIPTION OF THE DRAWINGS

This object, and other objects and advantages of the present invention, will appear more clearly from the following specification in conjunction with the accompanying schematic drawings, in which:

FIG. 5 demonstrates the starting phase of the winding of a bead core according to FIGS. 1 and 3, whereby the beginning of the ply has been attached to the drum and whereby the end of the ply has wires of varying lengths to compensate for the greater circumference of the radially outer path.

SUMMARY OF THE INVENTION

Figure 1:
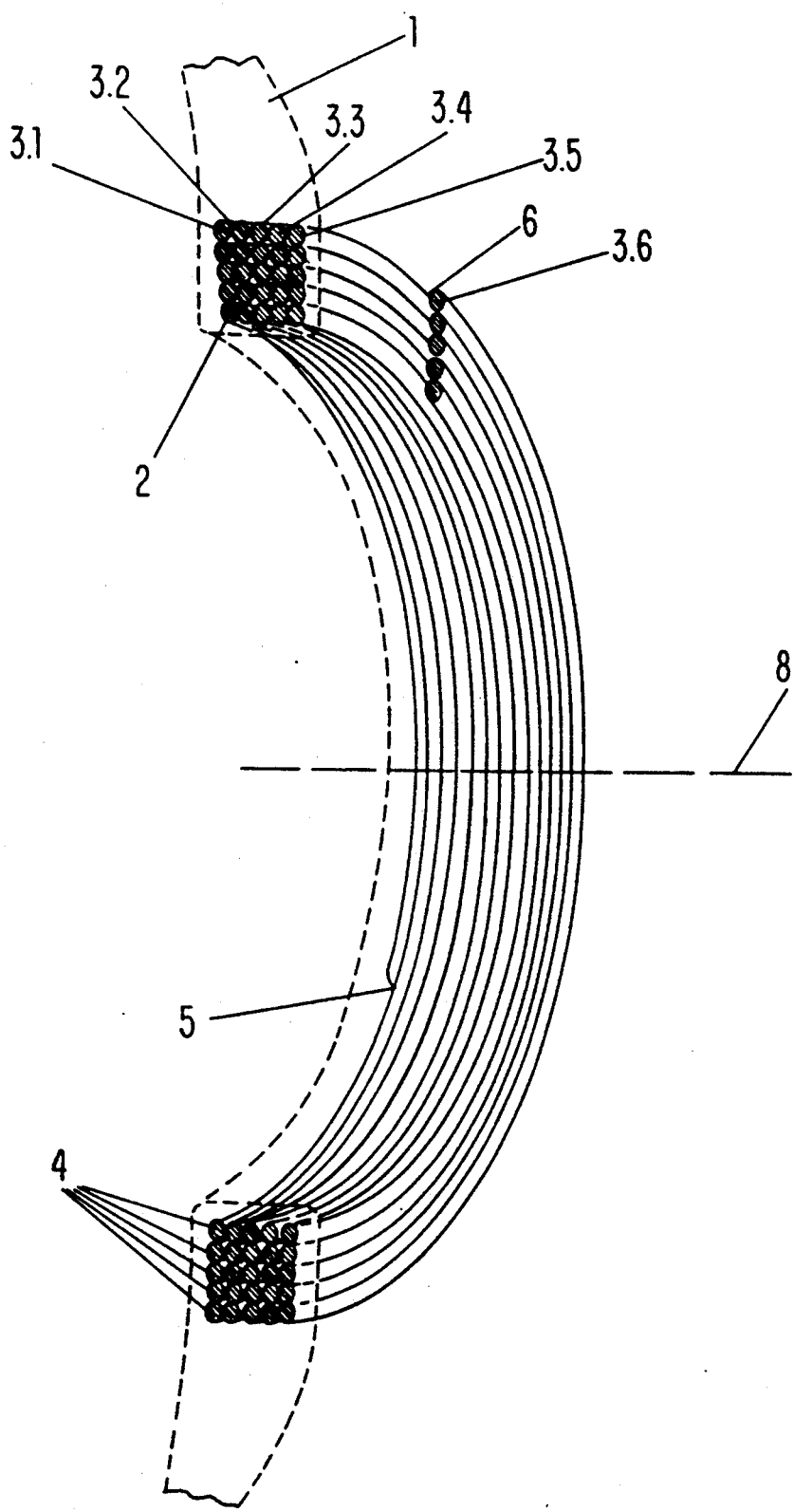
FIG. 1 is a partial perspective and cross-sectional view of one exemplary embodiment of the inventive bead core.

The bead core of the present invention is characterized primarily in that each of the layers thereof has a radial dimension component that is greater than an axial dimension component of that layer.

Essentially, the bead core of the present invention is characterized by the width of the layers extending substantially in a radial direction of the tire, and the ply built of load-carriers being wound in a plurality of windings to form a helix, whereby the beginning of the ply is arranged at a first axial face of the bead core and the end of the ply is arranged at a second axial face of the bead core.

The load-carrier layers of the bead core are advantageously disposed in such a way that when vulcanization is completed and the tire has been mounted, these layers with their width are disposed parallel to the rim flanges of the wheel. The rim flanges of most wheel rims have only a slight conicity or taper, i.e. they essentially extend in a radial direction of the tire, while their dimension in the axial direction of the tire is of minor importance. In conformity with the preferred parallel condition between the rim flanges and the bead core layers, the bead core layers with their width, should extend essentially in a radial direction of the tire axial dimension relative to the axial direction of the tire component that is as small as possible. With such an arrangement, the helical beginning and the helical end are essentially spaced axially from one another.

Thus, if the inventive bead core is viewed in cross-section, the individual layers no longer appear as a structure where the layers are stacked one upon the other, as is the case with the heretofore known Pierce core, but rather a structure is provided where the layers are disposed on edge and next to one another. Although the inventive bead core also has to a certain extent an unevenness at the beginning and end of the ply, these locations of unevenness are now essentially located at the axial face and no longer in the radial face, and as a result of which have practically no influence upon the radial dimension of the carcass, which essentially extends radially away from the bead core. Clearly improved concentricity or trueness without having to use special mechanical skills results from this shifting of the unevenness locations, which are unavoidable due to the winding technique, to the sides, namely the axial sides, of the bead core where the path of the filaments or cords of the radial carcass are influenced the least.

The load-carriers of the inventive bead cores, as is basically known from the state of the art, are also preferably metal wires, preferably copper or brass coated steel wires. This enables an economical manufacture that provides an advantageous rigidity. However, the load-carriers can also be made of Kevlar (aramid fibers or monofilaments) resulting in an especially advantageous ratio between stiffness and weight.

In order to produce the inventive bead core, the following process is recommended. First, that many individual load-carriers as are to be provided in a given, edgewise disposed layer are individually and continuously covered with rubber. Each of these thus-covered individual load-carriers is passed through a separate magazine that serves, in a known manner, as a storage means between a continuously operating extrusion unit and an intermittently operating core-winding mechanism. To start the core-winding process, that number of load-carriers that are to be provided in an edgewise layer are attached to a winding reel in such a way that they rest against one another, with the winding reel receiving the load-carriers on a flange pulley that is delimited radially inwardly by an axially symmetrical stop means having outer dimensions that correspond to the radially inner contour of the bead core that is to be wound. After the load-carriers have been attached, the winding reel is turned that number of times that is equal to the number of layers that are to be disposed essentially axially next to one another in the core that is to be wound. In this connection, the withdrawal speeds of the various load-carriers from their respective magazines differ from one another, because the further outwardly disposed load-carriers of a layer that is disposed on edge require a greater circumferential length in conformity with their larger radius. After the winding process has been completed, all of the load-carriers of the last-to-be-wound layer are cut off in a known manner, thus forming the ply, with the cut-off ends being pressed against the preceding layer and the thuscompleted bead core being withdrawn from the winding reel in the axial direction.

The unique feature of this method is that the load-carriers of the ply are not covered together with rubber but rather are covered individually, are individually stored in separate magazines, and are not joined together to form a ply until either directly upstream of the winding reel or even on the winding reel itself. It is thus possible in a particularly reliable manner to resolve the novel process problem that the load-carriers of the ply, due to the differences in their radii, require a varying withdrawal speed from the extruder that serves for covering the load-carriers with rubber. This process problem is novel because it does not exist during the production of the known Pierce cores, since with these known cores all of the load-carriers of the ply, which extends with its width only axially, have the same radius relative to the axis of rotation of the tire, and therefore also require only the same withdrawal speed.

The coating device or extruder for the rubber coating of the wires is known to perform reliably when continuously operated. Since the core winding process is necessarily performed discontinuously, the wires are guided through a buffer system in the from of a magazine that may be adjusted to a required length. Advantageously, in the inventive method for producing the inventive bead cores, the wires are continuously coated and a buffer system is provided between the coating device (extruder) and the core winding reel. Due to the varying withdrawal speeds of the different wires, each wire should be provided from a separate magazine and should be coated by a separate extruder. In order to prevent the formation of air pockets during the build-up of the inventive layers, which are disposed on edge and are comprised of rubber-coated load-carriers, it is expedient for the outer contour of the rubber coating of the load-carriers to have the shape of a parallelogram or a square, in other words, a shape that differs from the conventional circular cross-sectional configuration. In so doing, it is advisable to manufacture the four sides in such a way that they are crowned.

Whereas for the process of winding the cores of the state of the art horizontally disposed axes of rotation are provided, a winding reel as an apparatus for carrying out the previously described inventive process for producing inventive bead cores is expediently provided with a vertically disposed axis of rotation. With such an arrangement, the force of gravity is utilized to press the applied layers against the flange pulley of the winding reel, so that the position of the layers is clearly defined.

The winding reel has its most straightforward geometrical shape if the axially symmetrical stop means, which forms that side of the bead core that is to be wound that in the finished tire faces radially inwardly, is embodied as a surface of a cylinder. As is known, a particularly good seating of a tire on a rim shoulder results if when viewed in cross-section the radially inner section edge of the bead core extends parallel to the rim shoulder. Since with most types of wheel rims the rim shoulder is slightly inclined in order to increase the sealing between the bead and the rim, which is, of course, important for tubeless tires, the axially symmetrical stop means preferably has the shape of the frustum of a cone, with the angle between the surface of the stop means or frustum and the axis of rotation being between 5° and 20°, depending upon the type of rim for which the tire is intended. Previously, this parallel condition could be achieved only with such bead cores that comprised a single wire, i.e., were not wound from one or more wire layers. However, such known cores that were wound from a single wire had the drawback that it took a long time to wind such cores; for example, a 6×6 wire unit required six times the winding time as was necessary for the common Pierce cores. With the present invention, bead cores that are compatible with rim contours can be produced just as rapidly as can the common Pierce cores, which are not compatible with the rim contours Pursuant to a further specific embodiment of the present invention, the compatibility to the rim contour is also achieved in the region of the rim flange by inclining the cross-section of the flange pulley of the winding reel in conformity with the rim cross-section for which a tire that is provided with the inventive bead core is intended by 80° to 85° relative to the axis of rotation.

Not only to achieve the compatibility to the rim contour but also to achieve a high guidance precision and reproducibility of the load-carrier layers that are wound on edge, it is recommended that the channel between the flange pulley and the stop means of the winding reel has an angle that is equal to or greater than 100°.

Further specific features of the present invention will be described in detail subsequently

DESCRIPTION OF PREFERRED EMBODIMENTS

Referring now to the drawings in detail, FIG. 1 is a perspective cross-sectional view through half of an inventive bead core 2. Illustrated in dashed lines is the bead region of the pneumatic vehicle tire 1 in which the bead core 2 is to be installed. Over the greatest portion of its circumference, the bead core 2 is comprised of five layers 3.1, 3.2, 3.3, 3.4, and 3.5; in the smaller circumferential portion, which is also designated as an overlap, the bead core 2, between the helical beginning 5 and the helical end 6 and including the end layer 3.6, is provided with six layers. All of the layers 3 are comprised of five wires 4.

The wires 4 within one layer are arranged adjacent to one another. Accordingly, the width $b_S$ of the layers corresponds to n times the thickness $d_D$ of the wire. The width $b_S$ of the layers extends substantially in the radial direction of the tire. The layers are wound from a single ply 12 (FIG. 5) that is formed by the load-carriers or wires 4. Thus, the ply 12 is being wound in a plurality of windings to form a helix whereby the beginning 5 of the ply 12 is arranged at a first axial face of the bead core and the end of the ply 12 is arranged at the second opposite axial face of the bead core.

Figure 3:
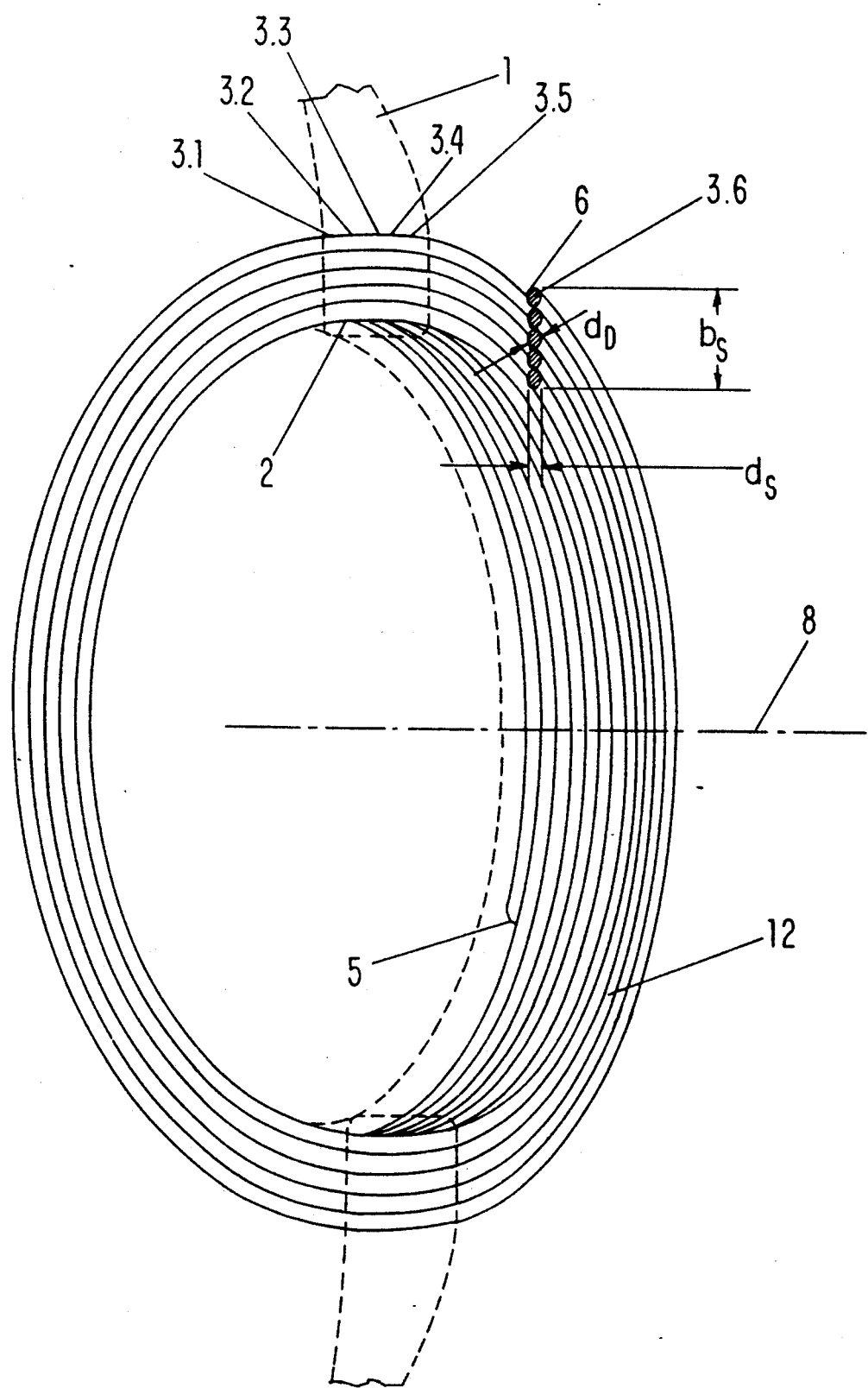
FIG. 3 shows the bead core according to FIG. 1 in perspective view.

As can be seen in particular at the cut ends 6 of the layer 3.6, in the illustrated embodiment all of the layers 3 have a radial arrangement of their load-carriers 4; the thickness $d_S$ of the layers (FIG. 3), which corresponds to the thickness $d_D$ of the individual wire, extends in the axial direction, and the is merely equal to the thickness of a load-carrier plus the rubber coating. The main dimension of the layers, their width $b_S$, extends in the radial direction (FIG. 3). Thus, in contrast to the heretofore known flat orientation of the layers, the layer sections are rotated by 90° and are disposed essentially, and in this embodiment actually exactly, on edge.

The term "axial" in this context (as is common practice) refers to all directions and dimensions that are parallel to the rotation axis 8 (FIG. 1). The term "radial" refers to all directions and dimensions that are disposed on straight lines intercepting the rotation axis 8.

Since the rubber coating is advantageously very thin, and on the scale illustrated is approximately the thickness of a line, this coating is not shown in FIG. 1 in order to facilitate illustration.

Figure 4:
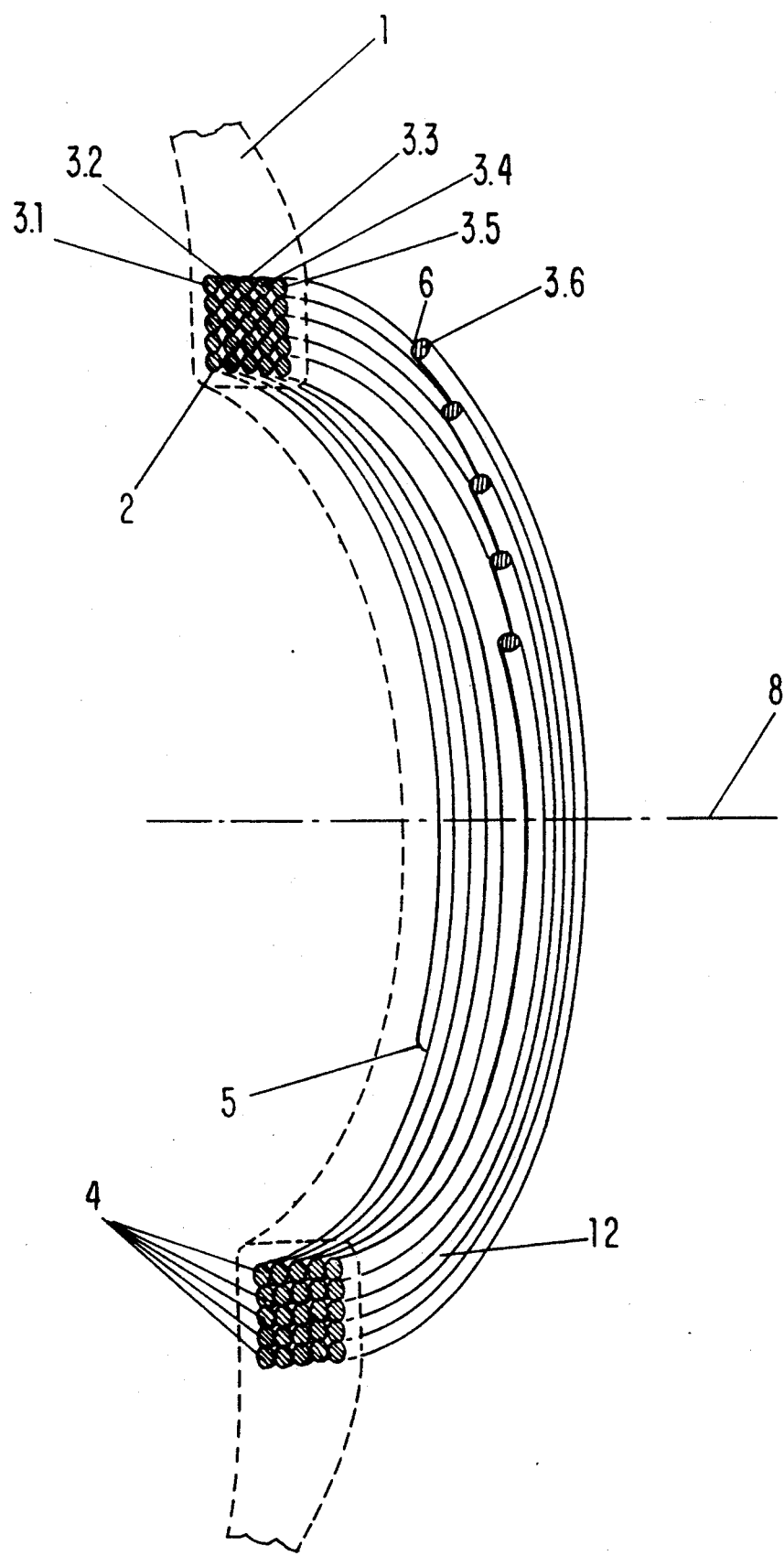
FIG 4. shows a different embodiment of the inventive bead core with varying lengths of the wires.

FIG. 4 shows a different embodiment of the bead core in which the wires 4 at the end of the ply 12 have been cut at different locations of the periphery. This demonstrates that the width b of the ply 12 may vary at its beginning or at its end relative to the respective circumferential position.

Figure 2:
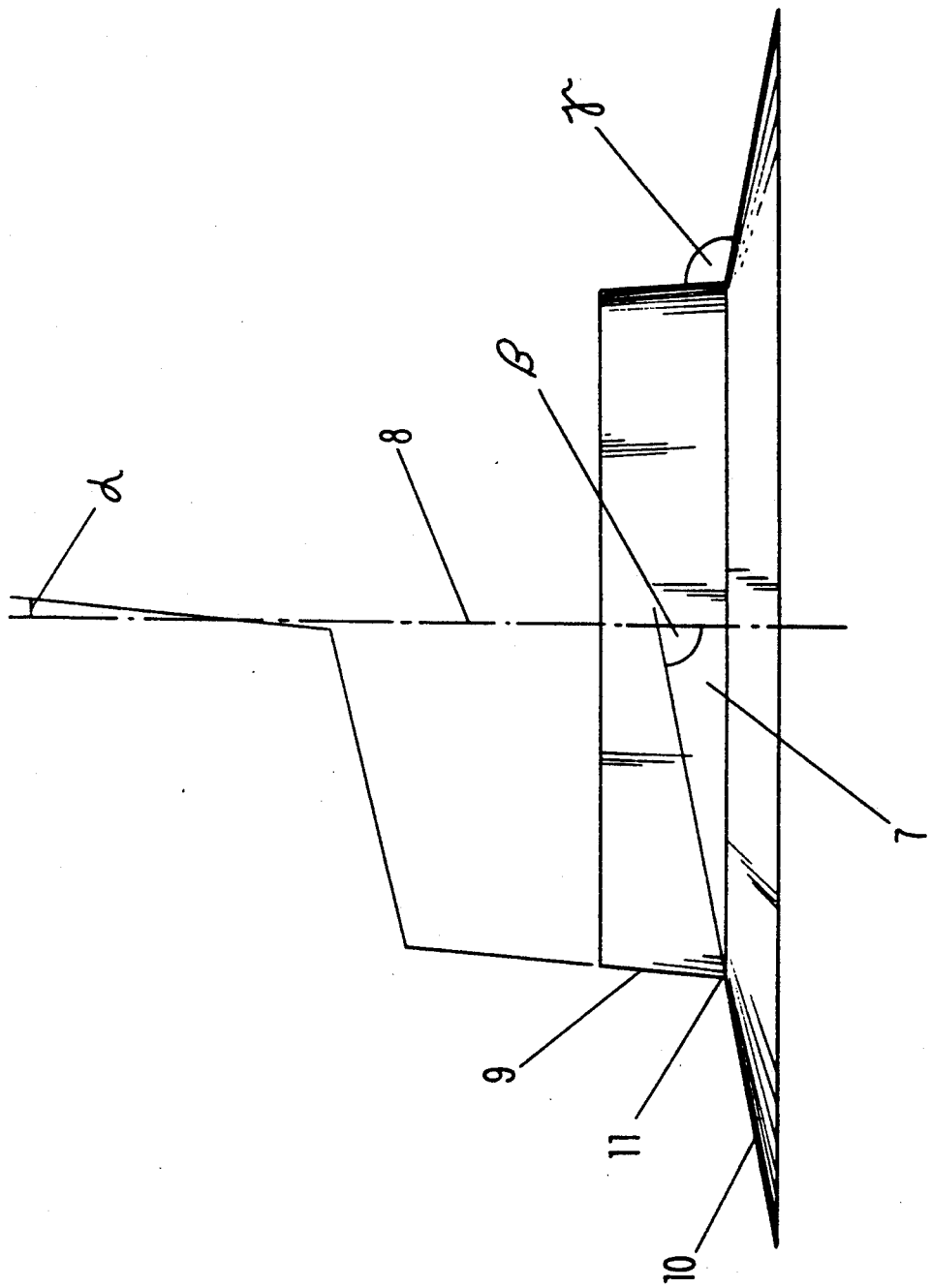
FIG. 2 is a side view of a winding reel or pulley as an apparatus for producing an advantageous, inventive bead core.

FIG. 2 shows a winding reel 7 for producing inventive bead cores. The core winding begins by attaching the beginning of a layer to the flange pulley 10, with the radially innermost position of the first layer being supported against the abutment or mantle surface 9 in the channel 11. In the illustrated embodiment, the mantle surface of the flange pulley 10 is inclined at an angle $\beta$ of about 80° relative to the axis of rotation 8. The inclination of the abutment surface 9 relative to the vertical or perpendicular axis of rotation 8 is in this embodiment the angle $\alpha$ of 5°. This results in a channel angle $\gamma$ of 105°.

It should be understood that the present invention is not limited to the illustrated embodiments. For example, the angles for a winding pulley for producing the core of FIG. 1 could be: $\alpha=0°$, $\beta=90°$, and $\gamma=90°$. The important thing for the inventive bead cores is merely that their radially inner side be essentially formed by the narrow ends of layers that are wound on edge from a single ply of wound layers, so that the disruption locations of the beginning and the end of the winding are shifted from the radially inner or outer side, where they are disposed with the Pierce core, to the two axial sides of the bead core. Although the Pierce core has only a single disruption location with regard to the true running or concentricity of the carcass, this disruption location being the beginning of the winding, while the inventive bead core has two disruption locations, mainly the beginning and the end of the winding, both of which contact the carcass, nonetheless the influence of the disruption locations of the inventive bead core is several times less, resulting in the superior trueness or concentricity that is exhibited by pneumatic vehicle tires that are equipped with the inventive bead cores.

FIG. 5 demonstrates the attachment of the ply 12 comprising five wires 4 to the winding reel 7. It can be seen that the wires at the beginning of the ply are arranged at the same relative peripheral location of the reel 7. It is also demonstrated that the wires must be of a different length in order to compensate for the various path length of a radially outwardly or radially inwardly disposed circumferential path.

The inventive bead cores can be used not only with single-ply carcasses but also with multi-ply carcasses, and are particularly suitable for today's radial carcasses which, in contrast to the old-fashioned bias-ply tires, essentially cannot distribute discontinuities over larger areas of the tire periphery. No change is required with regard to the further buildup of a tire.

The present invention is, of course, in no way restricted to the specific disclosure of the specification and drawings, but also encompasses any modifications within the scope of the appended claims.

What I claim is:

1. A method for producing a bead core for a pneumatic vehicle tire, comprising the steps of:
   coating a number of individual wire load carriers with rubber with a coating device, whereby said number corresponds to a number of said wire load carriers for forming a layer of said bead core;
   after said coating step, attaching said number of individual wire load carriers radially adjacent to one another to a winding reel that has a flange pulley that is radially inwardly delimited by a rotationally symmetrical stop means having outer dimensions that correspond to the radially inner contour of said bead core;
   turning said winding reel a number of times that is equal to a number of said layers that are to be disposed essentially axially next to one another within said bead core;
   varying a respective withdrawal speed of said individual wire load carriers during said step of turning said winding reel;
   after completion of said step of turning said winding reel, cutting said wire load carriers;
   pressing cut ends of said wire load carriers onto said wound layers of said bead core; and
   removing said bead core thus formed in an axial direction from said winding reel.

2. A method according to claim 1, wherein said step of coating is continuously performed and further comprises the step of buffering a required length of said individual wire load carriers between said discontinuously operating winding reel and said continuously operating coating device in magazines; and said step of varying said respective withdrawal speed withdrawing each said individual wire load carrier from a respective one of said magazines.

3. A method according to claim 1, wherein in said step of turning said winding reel, said winding reel is turned about a vertical axis of rotation.

4. A method according to claim 1, wherein said step of turning said winding reel further comprises the step of forming said radially inner contour of said bead core with a mantle surface having an angle relative to an axis of rotation between 5° and 20°.

* * * * *